(12) United States Patent
Moon

(10) Patent No.: US 12,534,652 B2
(45) Date of Patent: Jan. 27, 2026

(54) REPEELABLE ADHESIVE INCLUDING PHOTOCURABLE ADHESIVE AND HEAT FOAMING AGENT AND REPEELABLE ADHESIVE TAPE INCLUDING THE SAME

(71) Applicants: Truss Co., Ltd, Incheon (KR); Ho Seup Moon, Incheon (KR)

(72) Inventor: Ho Seup Moon, Incheon (KR)

(73) Assignees: Truss Co., Ltd, Incheon (KR); Ho Seup Moon, Incheon (KR)

( * ) Notice: Subject to any disclaimer, the term of this patent is extended or adjusted under 35 U.S.C. 154(b) by 150 days.

(21) Appl. No.: 17/136,267

(22) Filed: Dec. 29, 2020

(65) Prior Publication Data

US 2022/0177742 A1    Jun. 9, 2022

(30) Foreign Application Priority Data

Dec. 8, 2020    (KR) .................. 10-2020-0170278

(51) Int. Cl.
| | |
|---|---|
| C09J 133/08 | (2006.01) |
| C08K 5/00 | (2006.01) |
| C08K 5/07 | (2006.01) |
| C08K 5/08 | (2006.01) |
| C08K 5/10 | (2006.01) |
| C08K 5/101 | (2006.01) |
| C08K 5/103 | (2006.01) |
| C08K 5/13 | (2006.01) |

(Continued)

(52) U.S. Cl.
CPC .......... *C09J 133/08* (2013.01); *C08K 5/0025* (2013.01); *C08K 5/07* (2013.01); *C08K 5/10* (2013.01); *C08K 5/101* (2013.01); *C08K 5/103* (2013.01); *C08K 5/13* (2013.01); *C08K 5/29* (2013.01); *C08K 9/10* (2013.01); *C09J 4/00* (2013.01); *C09J 4/06* (2013.01); *C09J 5/08* (2013.01); *C09J 7/20* (2018.01); *C09J 11/06* (2013.01); *C09J 131/04* (2013.01); *C09J 133/064* (2013.01); *C09J 133/12* (2013.01); *C09J 175/16* (2013.01); *C09J 2203/37* (2020.08); *C09J 2301/408* (2020.08); *C09J 2301/412* (2020.08); *C09J 2301/416* (2020.08); *C09J 2433/00* (2013.01); *C09J 2475/00* (2013.01)

(58) Field of Classification Search
None
See application file for complete search history.

(56) References Cited

U.S. PATENT DOCUMENTS

| | | | | |
|---|---|---|---|---|
| 5,952,071 A | * | 9/1999 | Rijsdijk | C09J 177/00 |
| | | | | 428/355 R |
| 6,086,795 A | * | 7/2000 | Hatton | C09J 11/06 |
| | | | | 252/582 |

(Continued)

FOREIGN PATENT DOCUMENTS

| | | |
|---|---|---|
| CN | 102421866 A | 4/2012 |
| JP | 07-048549 A | 2/1995 |

(Continued)

*Primary Examiner* — Frank D Ducheneaux
(74) *Attorney, Agent, or Firm* — Sughrue Mion, PLLC

(57) ABSTRACT

A repeelable adhesive including a photocurable adhesive and a heat foaming agent and a repeelable adhesive tape including the repeelable adhesive are disclosed. The repeelable adhesive maintains excellent adhesion, but easily peels off from an adherend after ultraviolet (UV) irradiation and heating.

3 Claims, 1 Drawing Sheet

(51) Int. Cl.
*C08K 5/29* (2006.01)
*C08K 9/10* (2006.01)
*C09J 4/00* (2006.01)
*C09J 4/06* (2006.01)
*C09J 5/08* (2006.01)
*C09J 7/20* (2018.01)
*C09J 11/06* (2006.01)
*C09J 131/04* (2006.01)
*C09J 133/06* (2006.01)
*C09J 133/12* (2006.01)
*C09J 175/16* (2006.01)

(56) References Cited

U.S. PATENT DOCUMENTS

| | | | | |
|---|---|---|---|---|
| 6,447,900 | B1* | 9/2002 | Ohtani | C09J 7/385 |
| | | | | 524/833 |
| 6,630,239 | B2* | 10/2003 | Cernohous | C09J 133/06 |
| | | | | 428/355 R |
| 8,883,922 | B2* | 11/2014 | Iseki | C09J 7/385 |
| | | | | 525/123 |
| 2007/0218276 | A1* | 9/2007 | Hiramatsu | G02F 1/133308 |
| | | | | 428/354 |
| 2010/0129989 | A1* | 5/2010 | Kamiya | B32B 29/002 |
| | | | | 438/464 |
| 2010/0178500 | A1* | 7/2010 | Wada | H01L 24/29 |
| | | | | 428/355 AC |
| 2010/0215947 | A1* | 8/2010 | Yamanaka | C09J 7/385 |
| | | | | 428/323 |
| 2010/0330354 | A1* | 12/2010 | Tsukagoshi | C09J 7/22 |
| | | | | 428/220 |
| 2011/0111220 | A1* | 5/2011 | Takarada | C09J 7/385 |
| | | | | 428/343 |
| 2012/0058334 | A1 | 3/2012 | Okamoto et al. | |
| 2012/0087030 | A1* | 4/2012 | Devisetti | G02B 5/0875 |
| | | | | 359/883 |
| 2021/0139754 | A1* | 5/2021 | Ishii | C09J 151/06 |

FOREIGN PATENT DOCUMENTS

| | | | |
|---|---|---|---|
| JP | 5717030 B2 | 5/2015 | |
| KR | 10-2011-0131772 A | 12/2011 | |
| KR | 10-1600686 B1 | 2/2016 | |
| WO | WO-2020023292 A1 * | 1/2020 | C09D 4/00 |

* cited by examiner

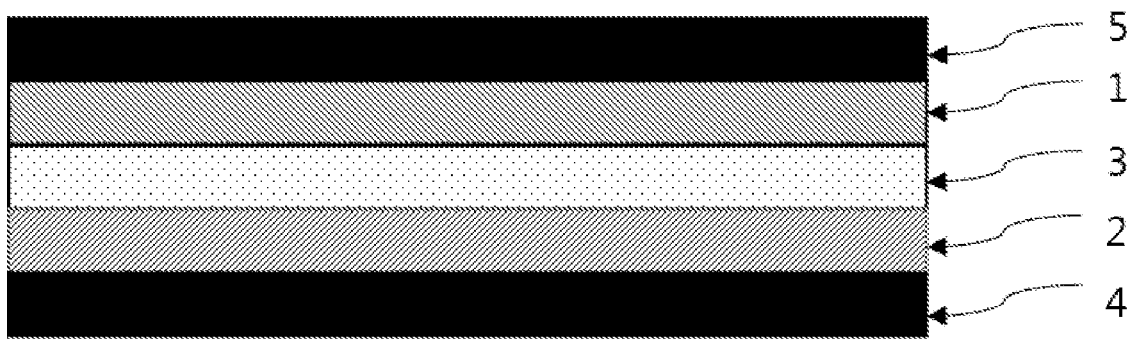

REPEELABLE ADHESIVE INCLUDING PHOTOCURABLE ADHESIVE AND HEAT FOAMING AGENT AND REPEELABLE ADHESIVE TAPE INCLUDING THE SAME

CROSS-REFERENCE TO RELATED APPLICATION

This application claims the benefit of Korean Patent Application No. 10-2020-0170278, filed on Dec. 8, 2020, in the Korean Intellectual Property Office, the disclosure of which is incorporated herein in its entirety by reference.

BACKGROUND

1. Field

The present invention relates to a repeelable adhesive including a photocurable adhesive and a heat foaming agent, and a repeelable adhesive tape including the same, wherein the repeelable adhesive maintains excellent adhesion, but easily peels off from an adherend after ultraviolet (UV) irradiation and heating.

2. Description of Related Art

Acrylic foam-type adhesive tapes (acrylic adhesive tapes containing fine particles on a base layer and/or an adhesive layer) are often used when requiring adhesion or shear strength of a pressure-sensitive adhesive tape having a pressure-sensitive adhesive layer containing fine particles at room temperature, for example, when bonding members in various fields such as automobiles, mechanical parts, electronic products, and building materials.

Under this situation, conventional acrylic foam-type adhesive tapes have high bonding reliability due to high adhesion, but on the contrary, high bonding strength makes it difficult to separate and disassemble the bonding portions.

As these conventionally known acrylic foam-type adhesive tapes, a pressure-sensitive adhesive tape in which glass microbubbles (hollow microspheres) are dispersed in a composition forming an adhesive layer or an acrylic adhesive layer is disclosed (see Japanese Patent Publication No. (So) 57-17030 and Japanese Patent Publication No. (Hei) 7-48549). Such foam-type tapes exhibit very high peel strength. However, due to high peel strength, the foam-type tapes may not be peeled off.

The inventors of the present invention have studied to solve the above problems and have found that, when preparing a repeelable adhesive using a heat foaming agent and a photocurable adhesive in which a composition having an acrylic copolymer, a photocurable acrylate monomer, etc. with a certain composition ratio is polymerized, the repeelable adhesive maintained excellent adhesion, but completely peeled off from an adherend without adhesive transfer after UV irradiation and heating. In this manner, the present invention has been completed.

SUMMARY

The present invention has been made in an effort to solve the problems of the related art, and an object of the present invention is to provide a repeelable adhesive including a photocurable adhesive composition and a heat foaming agent.

In addition, an object of the present invention is to provide a repeelable adhesive tape prepared by applying the adhesive to a base layer.

That is, in the case of an existing foam tape, adhesion may be easily reduced by heating, but the adhesive or foam residue may finely remain on an adherend. In the case of a photocurable tape, adhesion may almost be eliminated by UV irradiation, but the photocurable tape is not easily peeled off due to wettability of a base layer used.

In addition, in the case of an adherend with excellent surface smoothness and wettability and an adherend used in a pressing process, adhesion continuously increases during a process, making it relatively difficult to peel off after processing. Therefore, an object of the present invention is to provide a repeelable adhesive and a repeelable adhesive tape including the same, in which after photocuring is performed with primary UV irradiation, foaming is performed by secondary heating, so that complete peeling occurs without adhesive transfer or foaming agent residue on an adherend by physical and/or chemical methods.

According to an aspect of the present invention, there is provided a repeelable adhesive including: a photocurable adhesive prepared by polymerizing a photocurable adhesive composition including an acrylic copolymer, a photocurable acrylate-based monomer, a photocurable urethane acrylate-based oligomer, a crosslinking agent, and a photoinitiator; and a heat foaming agent.

The acrylic copolymer may be a polymerized acrylate-based monomer having 2 to 15 carbon atoms.

The acrylic copolymer may be a polymerized monomer selected from the group consisting of 2-ethylhexyl acrylate (2-EHA), vinyl acetate (VA), methyl methacrylate (MMA), acrylic acid (AA), and combinations thereof.

The photocurable acrylate-based monomer may include a monomer selected from the group consisting of 1,4-hexanediol diacrylate, 1,6-butanediol diacrylate, polyethylene glycol diacrylate, pentaerythritol triacrylate, trimethylolpropane triacrylate, ditrimethylolpropane tetraacrylate, dipentaerythritol pentaacrylate, pentaerythritol pentaacrylate, pentaerythritol tetraacrylate, tris(2-hydroxyalkyl)isocyanurate triepoxide, triallylisocyanurate, tris(2-hydroxyalkyl)isocyanurate triacrylate, isophorone diisocyanurate, alkyldiisocyanurate, alicyclic diisocyanurate compound, alkyl diisocyanurate trimer, decyl acrylate, lauryl acrylate, stearyl acrylate, tetrahydrofurfuryl acrylate, cyclic trimethylolformal acrylate, phenoxypolyethylene glycol acrylate, lauryl acrylate, benzyl acrylate, epoxy ethyl acrylate, phenoxyethylacrylate, tripropylene glycol diacrylate, and combinations thereof.

The photocurable urethane acrylate-based oligomer may include an aliphatic urethane acrylate having 2 to 6 functional groups.

The crosslinking agent may include a crosslinking agent selected from the group consisting of 2,4-toluene diisocyanate, 2,6-toluene diisocyanate, 1,5-naphthalene diisocyanate, diphenylmethane diisocyanate, hexamethylene diisocyanate, isophorone diisocyanate, P-xylylenediisocyanate, M-xylylenediisocyanate, dicyclohexylmethane diisocyanate, aliphatic polyisocyanate, and combinations thereof.

The photoinitiator may include a material selected from the group consisting of benzophenone, benzyl dimethyl ketal, benzoin, benzoin methyl ether, benzoin isopropyl ether, benzoin isobutyl ether, methyl benzoin benzoate, benzoin benzoic acid, acetophenone, 2,2-dimethoxy-2-phenylacetophenone, 2,4-diethylthioxanthone, alpha-hydroxycyclohexylphenylketone, benzyldiphenylsulfide, and combinations thereof.

Based on 100 parts by weight of the acrylic copolymer, an amount of the photocurable acrylate-based monomer may be 1 part by weight to 50 parts by weight, an amount of the photocurable urethane acrylate-based oligomer may be 5 parts by weight to 100 parts by weight, an amount of the crosslinking agent may be 0.1 parts by weight to 10 parts by weight, and an amount of the photoinitiator may be 0.1 parts by weight to 10 parts by weight.

The heat foaming agent may include a material selected from the group consisting of microencapsulated thermally expandable microspheres, an inorganic foaming agent, an organic foaming agent, and combinations thereof.

An amount of the heat foaming agent may be 0.5 parts by weight to 50 parts by weight based on 100 parts by weight of the photocurable adhesive.

When the repeelable adhesive is coated on a base layer and irradiated with ultraviolet (UV) rays having a wavelength of 200 nm to 500 nm, an adhesion reduction rate calculated by Equation 1 may be 90% or more:

$$\text{adhesion reduction rate (\%)} = \frac{\text{adhesion before } UV \text{ irradiation} - \text{adhesion after } UV \text{ irradiation}}{\text{adhesion before } UV \text{ irradiation}} \quad [\text{Equation 1}]$$

According to another aspect of the present invention, there is provided a repeelable adhesive tape prepared by coating the repeelable adhesive on a base layer.

The repeelable adhesive tape may be simultaneously cured and foamed by ultraviolet (UV) irradiation and heat.

The heat may have a temperature of 100° C. to 270° C.

BRIEF DESCRIPTION OF DRAWING

FIG. 1 is a schematic diagram illustrating a state of use of a repeelable adhesive tape including a photocurable adhesive and a heat foaming agent, according to an embodiment of the present invention.

DETAILED DESCRIPTION

Hereinafter, the present invention will be described in more detail. However, the present invention may be embodied in many different forms. The present invention is not limited to the embodiments of the present invention described herein and is only defined by the appended claims.

In addition, the terms as used herein are only used to describe specific embodiments, and are not intended to limit the present invention. The singular forms "a," "an," and "the" as used herein are intended to include the plural forms as well unless the context clearly indicates otherwise. It will be understood that the terms "comprise," "include," or "have" as used herein specify the presence of stated elements, but do not preclude the presence or addition of one or more other elements.

Prior to the detailed description of the present invention, a repeelable adhesive including a photocurable adhesive and a heat foaming agent according to the present invention may be used as a double-sided tape for fixing an adherend in a process that requires cutting and polishing, such as module parts, IR filters, glass, and lenses used in semiconductors, electric and electronic devices, and mobile devices, etc. That is, since there should be no separation between a jig and an adherend during the cutting or polishing of the adherend, strong adhesion of an adhesive for fixing the jig and the adherend is required, and the jig and the adherend has to be easily peeled off from each other after processing. In this regard, an ultraviolet (UV) curable adhesive is usually used. However, in the case of a conventional UV curable adhesive, a jig and an adherend compressed with each other are not easily separated. In addition, a foam tape does not provide high adhesion. Due to this, an adherend and a jig are not properly fixed to each other during cutting and polishing and are easily separated from each other, thus causing defects. Therefore, the present invention intends to provide a repeelable adhesive which has excellent adhesion and can easily adjust an initial tack, and of which adhesion is completely eliminated after UV curing and heating, so that the repeelable adhesive is easily peeled off from a jig and an adherend. Specifically, since the repeelable adhesive includes a photocurable adhesive and a heat foaming agent, adhesion is eliminated by primary UV curing. By applying secondary heat, a foaming agent is expanded to reduce the surface adhesion area between the jig and the adherend. Therefore, the repeelable adhesive may be easily peeled off (separated).

A first aspect of the present invention provides a repeelable adhesive including: a photocurable adhesive prepared by polymerizing a photocurable adhesive composition including an acrylic copolymer, a photocurable acrylate-based monomer, a photocurable urethane acrylate-based oligomer, a crosslinking agent, and a photoinitiator; and a heat foaming agent.

Hereinafter, a repeelable adhesive according to a first aspect of the present invention will be described in detail with reference to FIG. 1. FIG. 1 is a schematic diagram illustrating a state of use of a repeelable adhesive according to an embodiment of the present invention.

In an embodiment of the present invention, a photocurable adhesive composition may include an acrylic copolymer. The acrylic copolymer may be a polymerized acrylate-based monomer having 2 to 15 carbon atoms, and may be preferably a polymerized monomer selected from the group consisting of 2-ethylhexyl acrylate (2-EHA), vinyl acetate (VA), methyl methacrylate (MMA), acrylic acid (AA), and combinations thereof. On the other hand, according to an embodiment of the present invention, the acrylic copolymer may be prepared by polymerizing 2-ethylhexyl acrylate (2-EHA), vinyl acetate (VA), methyl methacrylate (MMA), and acrylic acid (AA).

In this case, based on 100 parts by weight of the 2-ethylhexyl acrylate (2-EHA), the amount of the vinyl acetate (VA) may be 20 parts by weight to 40 parts by weight, the amount of the methyl methacrylate (MMA) may be 10 parts by weight to 20 parts by weight, and the amount of the acrylic acid (AA) may be 1 part by weight to 20 parts by weight. More preferably, the amount of the vinyl acetate (VA) may be 29 parts by weight to 32 parts by weight, the amount of the methyl methacrylate (MMA) may be 14 parts by weight to 16 parts by weight, and the amount of the acrylic acid (AA) may be 2 parts by weight to 10 parts by weight. When the amounts of the monomers are out of the above ranges, the adhesive performance of the photocurable adhesive prepared therefrom may be deteriorated, and the degree of elimination of the adhesion after photocuring may be insignificant.

In an embodiment of the present invention, the acrylic copolymer may be prepared by solution polymerization of an acrylate-based monomer in a solvent and an initiator. In this case, the solvent may be a solvent used for a conventional solution polymerization, and preferably ethyl acetate (EA). In addition, the initiator may be an azo-based initiator, for example, 2,2-azobisisobutyronitrile (AIBN). On the other hand, the amount of the solvent may be 100 parts by weight to 200 parts by weight, and preferably 130 parts by weight to 170 parts by weight based on 100 parts by weight of the acrylate-based monomer. According to an embodiment of the present invention, the amount of the solvent may be about 150 parts by weight. In addition, the amount of the initiator may be 0.001 parts by weight to 5 parts by weight, and preferably 0.1 parts by weight to 2 parts by weight, based on 100 parts by weight of the acrylate-based monomer. According to an embodiment of the present invention, the amount of the initiator may be about 0.3 parts by weight.

In an embodiment of the present invention, the photocurable adhesive composition may include a photocurable acrylate-based monomer. In this case, the photocurable acrylate-based monomer may be an acrylic monomer having 2 to 6 vinyl groups. For example, the photocurable acrylate-based monomer may include a monomer selected from the group consisting of 1,4-hexanediol diacrylate, 1,6-butanediol diacrylate, polyethylene glycol diacrylate, pentaerythritol triacrylate, trimethylolpropane triacrylate, ditrimethylolpropane tetraacrylate, dipentaerythritol pentaacrylate, pentaerythritol pentaacrylate, pentaerythritol tetraacrylate, tris(2-hydroxyalkyl)isocyanurate triepoxide, triallylisocyanurate, tris(2-hydroxyalkyl)isocyanurate triacrylate, isophorone diisocyanurate, alkyldiisocyanurate, alicyclic diisocyanurate compound, alkyl diisocyanurate trimer, decyl acrylate, lauryl acrylate, stearyl acrylate, tetrahydrofurfuryl acrylate, cyclic trimethylolformal acrylate, phenoxypolyethylene glycol acrylate, lauryl acrylate, benzyl acrylate, epoxy ethyl acrylate, phenoxyethylacrylate, tripropylene glycol diacrylate, and combinations thereof. On the other hand, according to an embodiment of the present invention, the photocurable acrylate-based monomer may include 1,6-hexanediol diacrylate.

In an embodiment of the present invention, the amount of the photocurable acrylate-based monomer may be 1 part by weight to 50 parts by weight, and preferably 3 parts by weight to 20 parts by weight, based on 100 parts by weight of the acrylic copolymer. According to an embodiment of the present invention, the amount of the photocurable acrylate-based monomer may be about 10 parts by weight. When the amount of the photocurable acrylate-based monomer is less than the above range, the decrease in adhesion may be insignificant even when UV irradiation are irradiated onto the photocurable adhesive prepared therefrom. When the amount of the photocurable acrylate-based monomer exceeds the above range, adhesion excessively increases.

In an embodiment of the present invention, the photocurable adhesive composition may include a photocurable urethane acrylate-based oligomer. In this case, the photocurable urethane acrylate-based oligomer may include an aliphatic urethane acrylate having 2 to 6 functional groups. According to an embodiment of the present invention, the photocurable urethane acrylate-based oligomer may include 2-functionality aliphatic urethane acrylate and/or 6-functionality aliphatic urethane acrylate. On the other hand, when the number of functional groups of the urethane acrylate-based oligomer increases, high reactivity rapidly decreases adhesion after UV irradiation.

In an embodiment of the present invention, the amount of the photocurable urethane acrylate-based oligomer may be 5 parts by weight to 100 parts by weight, and preferably 20 parts by weight to 50 parts by weight, based on 100 parts by weight of the acrylic copolymer. According to an embodiment of the present invention, the amount of the photocurable urethane acrylate-based oligomer may be about 30 parts by weight. When the amount of the photocurable urethane acrylate-based oligomer exceeds the above range, cohesion of the photocurable adhesive prepared therefrom before UV irradiation may decrease, thus increasing adhesion due to cohesive failure. Also, the amount of the adhesive residue on the adherend increases.

In an embodiment of the present invention, the photocurable adhesive composition may include a crosslinking agent (curing agent). In this case, the crosslinking agent may include a crosslinking agent selected from the group consisting of 2,4-toluene diisocyanate, 2,6-toluene diisocyanate, 1,5-naphthalene diisocyanate, diphenylmethane diisocyanate, hexamethylene diisocyanate, isophorone diisocyanate, P-xylylenediisocyanate, M-xylylenediisocyanate, dicyclohexylmethane diisocyanate, aliphatic polyisocyanate, and combinations thereof. According to an embodiment of the present invention, the crosslinking agent may include 2,4-toluene diisocyanate. The crosslinking agent may crosslink an acrylic copolymer, a photocurable acrylate-based monomer, and a photocurable urethane acrylate-based oligomer during polymerization of the photocurable adhesive composition. The physical properties of the photocurable adhesive that is polymerized in this manner may be adjustable.

In an embodiment of the present invention, the amount of the crosslinking agent may be 0.1 parts by weight to 10 parts by weight, and preferably 0.1 parts by weight to 5 parts by weight, based on 100 parts by weight of the acrylic copolymer. According to an embodiment of the present invention, the amount of the crosslinking agent may be about 1 part by weight. When the amount of the crosslinking agent is less than the above range, adhesive residue, that is, cohesive failure may occur due to insufficient curing. When the amount of the crosslinking agent exceeds the above range, a crosslinking density increases and adhesion decreases.

In an embodiment of the present invention, the photocurable adhesive composition may include a photoinitiator. In this case, the photoinitiator may include a material selected from the group consisting of benzophenone, benzyl dimethyl ketal, benzoin, benzoin methyl ether, benzoin isopropyl ether, benzoin isobutyl ether, methyl benzoin benzoate, benzoin benzoic acid, acetophenone, 2,2-dimethoxy-2-phenylacetophenone, 2,4-diethylthioxanthone, alpha-hydroxycyclohexylphenylketone, benzyldiphenylsulfide, and combinations thereof. Preferably, the photoinitiator may include alpha-hydroxycyclohexylphenyl ketone.

In an embodiment of the present invention, the amount of the photoinitiator may be 0.1 parts by weight to 10 parts by weight, and preferably 0.5 parts by weight to 5 parts by weight, based on 100 parts by weight of the acrylic copolymer. According to an embodiment of the present invention, the amount of the photoinitiator may be about 3 parts by weight. When the amount of the photoinitiator is less than the above range, photoinitiation may not be performed well and crosslinking may not occur smoothly. When the amount of the photoinitiator exceeds the above range, a crosslinking density increases and a coating film becomes brittle. Thus, adhesion to the adherend may decrease.

In an embodiment of the present invention, the photocurable adhesive may be prepared by polymerizing the photocurable adhesive composition described above. In this case, referring to FIG. 1, the polymerization may be performed by coating the photocurable adhesive composition on a base layer 3, and the polymerized photocurable adhesive may form adhesive layers 1 and 2. In this case, the polymerization may be performed by drying at a temperature of 100° C. to 200° C. for 1 minute to 5 minutes, and may preferably be performed by drying at a temperature of about 120° C. for about 2 minutes.

In an embodiment of the present invention, the base layer 3 may be a transparent or translucent film that may transmit UV irradiation. For example, the base layer 3 may be a film including a material selected from the group consisting of polyethylene terephthalate (PET), polyethylene (PE), polypropylene (PP), oriented polypropylene (OPP), and combinations thereof. On the other hand, the film may have a thickness of 4.5 μm to 150 μm, and preferably 25 μm to 75 μm.

In an embodiment of the present invention, the photocurable adhesive may have an adhesion of 3,000 gf/25 mm or more, and preferably 3,000 gf/25 mm to 4,000 gf/25 mm. On the other hand, when the photocurable adhesive is coated on the base layer and then irradiated with UV irradiation having a wavelength of 200 nm to 500 nm (preferably 300 nm to 400 nm) with a light intensity of 100 mJ/cm² to 3,000 mJ/cm², an adhesion reduction rate calculated by Equation 1 may be 90% or more, and preferably 98% or more.

$$\text{adhesion reduction rate (\%)} = \frac{\text{adhesion before } UV \text{ irradiation} - \text{adhesion after } UV \text{ irradiation}}{\text{adhesion before } UV \text{ irradiation}} \quad [\text{Equation 1}]$$

That is, the photocurable adhesive may have an adhesion of 50 gf/25 mm after UV irradiation. Therefore, the photocurable adhesive may have high adhesion before UV irradiation to firmly hold the adhesion of the adherend, but the adhesion of the photocurable adhesive after UV irradiation decreases rapidly, so that the photocurable adhesive is very easily peeled off from the adherend.

On the other hand, as illustrated in FIG. 1, the photocurable adhesive may form a first adhesive layer 1 and a second adhesive layer 2 on both sides of the base layer 3, and release liners 4 and 5 may be respectively formed on the other sides of the first adhesive layer 1 and the second adhesive layer 2. The release liners 4 and 5 may be formed so as to protect the photocurable adhesive from external contaminants. Specifically, since the reaction may be inhibited by oxygen in air during the photopolymerization reaction of the photocurable adhesive composition, the release liners 4 and 5 may be used to cover the photocurable adhesive composition so as to prevent contact with oxygen. Thereafter, in the actual use, the release liners 4 and 5 may be removed and then adhere to the adherend.

In an embodiment of the present invention, the repeelable adhesive may include a heat foaming agent. In this case, the heat foaming agent may include a material selected from the group consisting of microencapsulated thermally expandable microspheres, an inorganic foaming agent, an organic foaming agent, and combinations thereof. Preferably, the heat foaming agent may be microencapsulated thermally expandable microspheres. At this time, the microencapsulated thermally expandable microspheres may be "MATSUMOTO MICROSPHERE®" F-30, F-36, F-48, F-80, F-65, FN-100S, or FN-180 manufactured by Matsumoto Yuji Seiyaku Co. Ltd. In addition, the heat foaming agent may have an average particle size of 1 μm to 50 and preferably 3 μm to 30 μm, considering dispersibility and foaming power.

In an embodiment of the present invention, the amount of the heat foaming agent may be 0.5 parts by weight to 50 parts by weight, and preferably 10 parts by weight to 40 parts by weight, based on 100 parts by weight of the photocurable adhesive. According to an embodiment of the present invention, the amount of the heat foaming agent may be about 20 parts by weight. When the amount of the heat foaming agent is less than the above range, expansion and deformation due to heat may not be sufficient, and thus peeling may not be performed smoothly. When the amount of the heat foaming agent exceeds the above range, expansion and deformation may be sufficient, and thus peeling may be performed easily. After foaming, adhesion to the base layer may be lowered, and thus interface failure may be caused and residues may remain. On the other hand, as the amount of the heat foaming agent increases, adhesion at room temperature may decrease due to a reduction in the tack.

In an embodiment of the present invention, the foaming of the heat foaming agent may be performed by heating at a temperature of 100° C. to 270° C. for 1 minute to 5 minutes, considering the type and the foaming condition of the foaming agent. In addition, as illustrated in FIG. 1, when the composition including the photocurable adhesive and the heat foaming agent is applied to the base layer 3, the coating thickness may be 10 μm to 100 μm, and preferably 40 μm to 70 μm. When the coating thickness is less than the above range, the coating surface may be uneven due to heat foaming agent particles, resulting in a decrease in wettability and adhesion to the adherend. When the coating thickness exceeds the above range, a problem may occur in repeeling from the adherend.

In an embodiment of the present invention, the repeelable adhesive may have an adhesion of 2,000 gf/25 mm or more, and the adhesion may be completely disappeared after UV irradiation and heat foaming. Therefore, the adhesive may be peeled off without leaving a residue on the adherend through UV irradiation and heat foaming.

In an embodiment of the present invention, in the case of the repeelable adhesive including both the photocurable adhesive and the heat foaming agent, when the degree of curing of the adhesive increases, the crosslinking density increases. Therefore, the thermal expansion force of the heat foaming agent decreases. Due to this, the peeling force may increase, making separation/disassembly difficult. In contrast, when the degree of curing decreases, the crosslinking density decreases and the thermal expansion force increases. Therefore, separation/disassembly may be facilitated. However, adhesive residues may remain on the adherend. Accordingly, it is very important to adjust the degree of curing of the adhesive. The degree of curing of the adhesive may be adjustable by the light intensity of UV irradiation and may be measured as a gel fraction according to the light intensity of UV irradiation. At this time, a gel fraction may be calculated using Equation 2 based on ASTM D2765 by 1) manufacturing a 120 mesh bag, measuring the weight of the bag, cutting a specimen into about 0.3 g, putting the specimen in the bag, sealing the bag, and measuring the weight of the bag again, 2) extracting a sample for 12 hours using toluene as a solvent, and 3) drying the extracted sample in an oven at a temperature of 150° C. for 15 minutes and then measuring the weight of the dried sample.

$$\text{Gel fraction (\%)}=(W3-W1)/(W2-W1)\times100 \quad \text{[Equation 2]}$$

In Equation 2, W1 may represent the weight of the bag, W2 may represent the weight of the bag containing the specimen before extraction, and W3 may represent the weight of the bag after extraction.

In the case of the repeelable adhesive according to the present invention, the gel fraction calculated using Equation 2 may be 80% to 92%, and preferably about 85%. When the gel fraction is less than 80%, the thermal expansion coefficient of the heat foaming agent is three times or more and the foaming power may be excellent, but adhesive residues may remain on the adherend. When the gel fraction exceeds 92%, the thermal expansion of the heat foaming agent hardly occurs and the foaming time may also be long. On the other hand, when the gel fraction is about 85%, the thermal expansion coefficient of the heat foaming agent may be constant as 1.5 times to 2 times, peeling from the adherend may be facilitated, and adhesive residues may not remain. In addition, when the light intensity of UV irradiation irradiated is less than 200 mJ/cm$^2$, the gel fraction may be less than 80%, and when the light intensity of UV irradiation exceeds 2,000 mJ/cm$^2$, the gel fraction may be 93% or more.

In an embodiment of the present invention, the adhesion of the repeelable adhesive may be eliminated by curing the repeelable adhesive through primary UV irradiation when peeling off from the adherend, and the heat foaming agent may be expanded by applying secondary heat. Thus, the surface adhesion area with the adherend may be reduced, thereby facilitating peeling (separation).

A second aspect of the present invention provides a repeelable adhesive tape prepared by coating the repeelable adhesive according to the first aspect of the present invention on a base layer.

The detailed description of the parts overlapping the first aspect of the present invention is omitted. However, the detailed description of the first aspect of the present invention may be equally applied even though the description thereof is omitted in the second aspect of the present invention.

Hereinafter, the repeelable adhesive tape according to the second aspect of the present invention will be described in detail with reference to FIG. 1. FIG. 1 is a schematic diagram illustrating a state of use of a repeelable adhesive according to an embodiment of the present invention.

In an embodiment of the present invention, the repeelable adhesive tape may be prepared by applying and coating a composition including the photocurable adhesive and the heat foaming agent on a base layer 3. In this case, the coating thickness may be 10 μm to 100 μm, and preferably 40 μm to 70 μm. When the coating thickness is less than the above range, the coating surface may be uneven due to heat foaming agent particles, resulting in a decrease in wettability and adhesion to the adherend. When the coating thickness exceeds the above range, a problem may occur in repeeling from the adherend. In addition, the base layer 3 may be a transparent or translucent film that may transmit UV irradiation. For example, the base layer 3 may be a film including a material selected from the group consisting of polyethylene terephthalate (PET), polyethylene (PE), polypropylene (PP), oriented polypropylene (OPP), and combinations thereof. On the other hand, the thickness of the film may be 4.5 μm to 150 μm, and preferably 25 μm to 75 μm.

On the other hand, as illustrated in FIG. 1, the repeelable adhesive tape may form a first adhesive layer 1 and a second adhesive layer 2 on both sides of the base layer 3, and release liners 4 and 5 may be respectively formed on the other sides of the first adhesive layer 1 and the second adhesive layer 2. The release liners 4 and 5 may be formed so as to protect the repeelable adhesive from external contaminants. Specifically, since the reaction may be inhibited by oxygen in air during the photopolymerization reaction of the repeelable adhesive, the release liners 4 and 5 may be used to cover the repeelable adhesive so as to prevent contact with oxygen. Thereafter, in the actual use, the release liners 4 and 5 may be removed and then adhere to the adherend.

Hereinafter, embodiments of the present invention will be described in detail with reference to the accompanying drawings so that the present invention may be easily carried out by those of ordinary skill in the art. However, the present invention may be embodied in many different forms and is not limited to the embodiments of the present invention described herein.

Preparation Example 1. Preparation of Acrylic Copolymer

Preparation Example 1-1

First, in order to prepare an acrylic copolymer, 150 parts by weight of ethyl acetate (EA) as a solvent and 0.3 parts by weight of azobisisobutyronitrile (AIBN) as an initiator were mixed and sufficiently stirred based on 100 parts by weight of a mixture including 2-ethylhexyl acrylate (2-EHA), vinyl acrylate (VA), methyl methacrylate (MMA), and acrylic acid (AA) as acrylic monomers. At this time, the weight ratio of the acrylic monomers was 68:20:10:2. ⅓ of the stirred mixture was added to a four-necked flask and reacted at 80° C. for 30 minutes while purging with nitrogen, and the remaining ⅔ of the stirred mixture was reacted while dropping for 2 hours and 30 minutes. When the dropping was completed, the reaction was further performed for 4 hours while maintaining a temperature of 80° C. to obtain an acrylic copolymer having a solid content of 40%.

Preparation Example 1-2

An acrylic copolymer was prepared in the same manner as in Preparation Example 1-1, except that the weight ratio of the acrylic monomers was 66:20:10:4.

Preparation Example 1-3

An acrylic copolymer was prepared in the same manner as in Preparation Example 1-1, except that the weight ratio of the acrylic monomers was 64:20:10:6.

The compositions and the content ratios used in Preparation Examples 1-1 to 1-3 are shown in Table 1 below.

TABLE 1

| | Preparation Examples 1-1 to 1-3 | | |
|---|---|---|---|
| Classification | Preparation Example 1-1 | Preparation Example 1-2 | Preparation Example 1-3 |
| 2-EHA | 68 | 66 | 64 |
| VA | 20 | 20 | 20 |
| MMA | 10 | 10 | 10 |

TABLE 1-continued

| | Preparation Examples 1-1 to 1-3 | | |
|---|---|---|---|
| Classification | Preparation Example 1-1 | Preparation Example 1-2 | Preparation Example 1-3 |
| AA | 2 | 4 | 6 |
| EA | 150 | 150 | 150 |
| AIBN | 0.3 | 0.3 | 0.3 |

Preparation Example 2. Preparation of Photocurable Adhesive

Preparation Example 2-1

In order to prepare a photocurable adhesive, the acrylic copolymer prepared in Preparation Example 1-1, 1,6-hexanediol diacrylate (MIRAMER® M200, Miwon SC Co., Ltd.) as a monomer, 2-functionality aliphatic urethane acrylate (MIRAMER® PU256, Miwon SC Co., Ltd.) as an oligomer, 2,4-toluene diisocyanate (TDI) as a crosslinking agent, and IRGACURE® 184 as a photoinitiator were mixed at a weight ratio of 100:10:30:1:3 to obtain a photocurable adhesive composition.

Preparation Example 2-2

A photocurable adhesive was prepared in the same manner as in Preparation Example 2-1, except that 6-functionality aliphatic urethane acrylate (MIRAMER® PU610, Miwon SC Co., Ltd.) was used as an oligomer.

Preparation Example 2-3

A photocurable adhesive was prepared in the same manner as in Preparation Example 2-1, except that the acrylic copolymer prepared in Preparation Example 1-2 was used.

Preparation Example 2-4

A photocurable adhesive was prepared in the same manner as in Preparation Example 2-3, except that 6-functionality aliphatic urethane acrylate (MIRAMER® PU610, Miwon SC Co., Ltd.) was used as an oligomer.

Preparation Example 2-5

A photocurable adhesive was prepared in the same manner as in Preparation Example 2-1, except that the acrylic copolymer prepared in Preparation Example 1-3 was used.

Preparation Example 2-6

A photocurable adhesive was prepared in the same manner as in Preparation Example 2-5, except that 6-functionality aliphatic urethane acrylate (MIRAMER® PU610, Miwon SC Co., Ltd.) was used as an oligomer.

Comparative Preparation Example 1

A photocurable adhesive was prepared in the same manner as in Preparation Example 2-1, except that 6-functionality aliphatic urethane acrylate (MIRAMER® PU610, Miwon SC Co., Ltd.) as an oligomer was mixed at a weight ratio of 60.

Comparative Preparation Example 2

A photocurable adhesive was prepared in the same manner as in Comparative Preparation Example 1, except that the acrylic copolymer prepared in Preparation Example 1-2 was used.

Comparative Preparation Example 3

A photocurable adhesive was prepared in the same manner as in Comparative Preparation Example 1, except that the acrylic copolymer prepared in Preparation Example 1-3 was used.

The compositions and the content ratios used in Preparation Examples 2-1 to 2-6 are shown in Table 2 below, and the compositions and the content ratios used in Comparative Preparation Examples 1 to 3 are shown in Table 3 below.

TABLE 2

| | Preparation Examples 2-1 to 2-6 | | | | | |
|---|---|---|---|---|---|---|
| | Classification | | | | | |
| | Preparation Example 2-1 | Preparation Example 2-2 | Preparation Example 2-3 | Preparation Example 2-4 | Preparation Example 2-5 | Preparation Example 2-6 |
| Acrylic copolymer | 100 (Preparation Example 1-1) | 100 (Preparation Example 1-1) | 100 (Preparation Example 1-2) | 100 (Preparation Example 1-2) | 100 (Preparation Example 1-3) | 100 (Preparation Example 1-3) |
| M200 | 10 | 10 | 10 | 10 | 10 | 10 |
| PU256 | 30 | — | 30 | — | 30 | — |
| PU610 | — | 30 | — | 30 | — | 30 |
| Crosslinking agent | 1 | 1 | 1 | 1 | 1 | 1 |
| Initiator | 3 | 3 | 3 | 3 | 3 | 3 |

TABLE 3

| | Comparative Preparation Examples 1 to 3 | | |
|---|---|---|---|
| Classification | Comparative Preparation Example 1 | Comparative Preparation Example 2 | Comparative Preparation Example 3 |
| Acrylic copolymer | 100 (Preparation Example 1-1) | 100 (Preparation Example 1-2) | 100 (Preparation Example 1-3) |
| M200 | 10 | 10 | 10 |
| PU256 | — | — | — |
| PU610 | 60 | 60 | 60 |

TABLE 3-continued

| | Comparative Preparation Examples 1 to 3 | | |
|---|---|---|---|
| Classification | Comparative Preparation Example 1 | Comparative Preparation Example 2 | Comparative Preparation Example 3 |
| Crosslinking agent | 1 | 1 | 1 |
| Initiator | 3 | 3 | 3 |

EXAMPLES. PREPARATION OF REPEELABLE ADHESIVE TAPE

Example 1

In order to prepare a repeelable adhesive tape, the photocurable adhesive composition prepared in Preparation Example 2-4 and F-36D as a heat foaming agent were mixed at a weight ratio of 100:20, coated on a PET film with a thickness of 50 μm, and dried at 100° C. for 2 minutes to prepare a 150-μm double-sided tape with an adhesive thickness of 50 μm applied on each side.

On the other hand, light intensity of UV of 800 mJ/cm$^2$ (wavelength of 365 nm, 80 W) were irradiated in a subsequent experiment.

Example 2

A double-sided tape was prepared in the same manner as in Example 1, except that F-65 was used as a heat foaming agent.

Example 3

A double-sided tape was prepared in the same manner as in Example 1, except that FN-180 was used as a heat foaming agent.

Comparative Example 1

A double-sided tape was prepared in the same manner as in Example 1, except that a heat foaming agent was mixed at a weight ratio of 40 in Example 1.

Comparative Example 2

A double-sided tape was prepared in the same manner as in Example 2, except that a heat foaming agent was mixed at a weight ratio of 40 in Example 1.

Comparative Example 3

A double-sided tape was prepared in the same manner as in Example 3, except that a heat foaming agent was mixed at a weight ratio of 40 in Example 1.

Comparative Example 4

A double-sided tape was prepared in the same manner as in Example 2, and light intensity of UV of 200 mJ/cm$^2$ (wavelength of 365 nm, 80 W) were irradiated in a subsequent experiment.

Comparative Example 5

A double-sided tape was prepared in the same manner as in Example 2, and light intensity of UV of 2,000 mJ/cm$^2$ (wavelength of 365 nm, 80 W) were irradiated in a subsequent experiment.

The compositions, the content ratios, and the UV light intensities used in Examples 1 to 3 are shown in Table 4 below, and the compositions, the content ratios, and the UV light intensities used in Comparative Examples 1 to 5 are shown in Table 5 below.

TABLE 4

| | Examples 1 to 3 | | |
|---|---|---|---|
| Classification | Example 1 | Example 2 | Example 3 |
| Photocurable adhesive composition | 100 | 100 | 100 |
| F-36D | 20 | — | — |
| F-65 | — | 20 | — |
| FN-180 | — | — | 20 |
| Light intensity of UV | 800 mJ/cm$^2$ | 800 mJ/cm$^2$ | 800 mJ/cm$^2$ |

TABLE 5

| | Comparative Examples 1 to 5 | | | | |
|---|---|---|---|---|---|
| Classification | Comparative Example 1 | Comparative Example 2 | Comparative Example 3 | Comparative Example 4 | Comparative Example 5 |
| Photocurable adhesive composition | 100 | 100 | 100 | 100 | 100 |
| F-36D | 40 | — | — | — | — |
| F-65 | — | 40 | — | 20 | 20 |
| FN-180 | — | — | 40 | — | — |
| Light intensity of UV | 800 mJ/cm$^2$ | 800 mJ/cm$^2$ | 800 mJ/cm$^2$ | 200 mJ/cm$^2$ | 2,000 mJ/cm$^2$ |

Experimental Example 1. Measurement of Adhesion of Tape Using Photocurable Adhesive by UV Irradiation Experiments for measuring adhesions of the tapes prepared in Preparation Examples 2-1 to 2-6 and Comparative Preparation Examples 1 to 3 by UV irradiation were carried out. To this end, the adhesion before UV irradiation was measured. Specifically, in accordance with ASTM D-1000, a test specimen was reciprocated and compressed once with a 2-kg roller on SUS304, and left for 20 minutes at room temperature. Then, adhesion was measured using INSTRON® 3343 at a peel angle of 180° and a peel rate of 300 mm/min. At this time, an ambient temperature was 23° C. and a humidity was 65%.

In addition, in order to measure adhesion after UV irradiation, the test specimen was reciprocated and compressed once with a 2-kg roller on SUS304, and light intensity of 800 mJ/cm$^2$ (wavelength of 365 nm, 80 W) was irradiated through a UV curing device provided with a 6-kw metal halide lamp. Then, adhesion was measured using INSTRON® 3343 at a peel angle of 180° and a peel rate of 300 mm/min.

On the other hand, in order to measure a probe tack, the test specimen was cut into a size of 25 mm×25 mm and attached to an annular ring with a test surface facing down. Then, the probe tack was measured using CHEMINSTRUMENT™ PT-1000. At this time, an ambient temperature was 23° C. and a humidity was 65%.

Results thereof are shown in Table 6 below, and the degrees of transfer of the adhesive remaining in the support or adherend before and after UV irradiation are shown as follows.

(⊚: No transfer and contamination, ●: Contamination without transfer, ○: less than 10%, Δ: less than 50%, X: 50% or more)

2-2, it could be confirmed that since the amount of acrylic acid (AA) was relatively small, the cohesion of the adhesive was lowered, thus increasing the adhesion due to cohesive failure. In addition, it could be confirmed that as the number of functional groups of the oligomer increased, the adhesion decreased, and it could be confirmed that when the number of functional groups of the oligomer increased, the adhesion decreased due to high reactivity during UV curing, and the reduction width also increased significantly. Furthermore, it could be confirmed that when the amount of the oligomer increased regardless of the number of functional groups of the oligomer, the cohesion of the adhesive before UV irradiation decreased, and thus, the adhesion increased due to cohesive failure and the transfer of the adhesive to the adherend also increased.

Experimental Example 2. Measurement of Adhesion of Repeelable Adhesive Tape by UV Irradiation Experiments for measuring the adhesions of the repeelable adhesive tapes prepared in Examples 1 to 3 and Comparative Examples 1 to 5 were carried out. To this end, the adhesion at room temperature was measured. Specifically, in accordance with ASTM D-1000, a test specimen was reciprocated and compressed once with a 2-kg roller on SUS304, and left for 20 minutes at room temperature. Then, adhesion at room temperature was measured using INSTRON® 3343 at a peel angle of 180° and a peel rate of 300 mm/min. At this time, an ambient temperature was 23° C. and a humidity was 65%.

In addition, in order to measure adhesion after UV irradiation and heat foaming, the test specimen was reciprocated and compressed once with a 2-kg roller on SUS304, and light intensity of 800 mJ/cm$^2$ (wavelength of 365 nm, 80 W), 200 mJ/cm$^2$, or 2,000 mJ/cm$^2$ was primarily irradiated through a UV curing device provided with a 6-kw metal halide lamp, and foaming was secondarily performed by heat at a high temperature chamber at 260° C. for 1 minute. Then, adhesion was measured using INSTRON® 3343 at a

TABLE 6

Physical property evaluation results

| Classification | Adhesion (gf/25 mm) | | Probe tack | | Adhesive transfer | |
|---|---|---|---|---|---|---|
| | Before UV irradiation | After UV irradiation | Before UV irradiation | After UV irradiation | Before UV irradiation | After UV irradiation |
| Preparation Example 2-1 | 3,696 | 43.1 | 420 | 0.88 | Δ | ● |
| Preparation Example 2-2 | 3,489 | 19.3 | 409 | 0.91 | Δ | ● |
| Preparation Example 2-3 | 3,301 | 42.3 | 354 | 0.87 | ○ | ⊚ |
| Preparation Example 2-4 | 3,214 | 18.1 | 343 | 0.81 | ○ | ⊚ |
| Preparation Example 2-5 | 3,554 | 41.4 | 127 | 0.79 | ○ | ⊚ |
| Preparation Example 2-6 | 3,320 | 20.9 | 144 | 0.82 | ○ | ⊚ |
| Comparative Preparation Example 1 | 3,980 | 10.7 | 437 | 0.87 | X | ● |
| Comparative Preparation Example 2 | 3,821 | 9.6 | 421 | 0.90 | X | ● |
| Comparative Preparation Example 3 | 4,083 | 11.1 | 418 | 0.87 | X | ● |

As shown in Table 6 above, it could be confirmed that the adhesion at room temperature increased as the amount of acrylic acid (AA), that is, the amount of a carboxyl group as a polar group increased. In Preparation Examples 2-1 and peel angle of 180° and a peel rate of 300 mm/min. At this time, an ambient temperature was 23° C. and a humidity was 65%.

Results thereof are shown in Table 7 below, and the degrees of transfer of the adhesive remaining in the support or adherend before and after UV irradiation and heat foaming are shown as follows.

(⊚: No transfer and contamination, ●: Contamination without transfer, ○: less than 10%, Δ: less than 50%, X: 50% or more)

On the other hand, the gel fraction was measured as follows in accordance with ASTM D2765. 1) First, a 120 mesh bag was made and the weight thereof was measured. A specimen was cut into about 0.3-g pieces and put in the bag. The bag was sealed, and the weight thereof was measured again. 2) A sample was extracted for 12 hours by using toluene as a solvent. iii) The extracted sample was dried in an oven at 150° C. for 15 minutes, and the weight thereof was measured to calculate the gel fraction.

Gel fraction (%)=($W3-W1$)/($W2-W1$)×100

W1=weight of bag
W2=weight of bag containing specimen before extraction
W3=weight of bag after extraction the adherend. After UV irradiation and heating, the adhesion of the repeelable adhesive is completely eliminated, so that the peeling from the adherend is further facilitated. When the repeelable adhesive is peeled off from the adherend, residues such as adhesive or foam particles are not contaminated, thereby obtaining very excellent repeelability.

While the present invention has been particularly shown and described with reference to exemplary embodiments thereof, the present invention is not limited to the specific exemplary embodiments. Therefore, various modifications or equivalents may be present within the scope of the technical idea of the present invention. Therefore, the scope of the technical idea according to the present invention should be interpreted by the appended claims, and the technical idea within the scope identical or equivalent thereto should be construed as falling within the scope of the present invention.

DESCRIPTION OF SYMBOLS

1: first adhesive layer
2: second adhesive layer
3: base layer
4: first release liner
5: second release liner

TABLE 7

| | Adhesion (gf/25 mm) | | Adhesive transfer | | Gel |
| --- | --- | --- | --- | --- | --- |
| Classification | Room temperature | Foaming after UV irradiation | Room temperature | Foaming after UV irradiation | fraction (%) |
| Example 1 | 1,374 | 0 | ⊚ | ⊚ | 86.5 |
| Example 2 | 2,280 | 0 | ⊚ | ⊚ | 86.3 |
| Example 3 | 1,759 | No foaming | ⊚ | — | 83.1 |
| Comparative Example 1 | 414 | 0 | ⊚ | ⊚ | 85.6 |
| Comparative Example 2 | 1,206 | 0 | ⊚ | ⊚ | 84.6 |
| Comparative Example 3 | 833 | No foaming | ⊚ | — | 83.4 |
| Comparative Example 4 | 2,240 | 0 | ⊚ | Δ | 78.5 |
| Comparative Example 5 | 2,200 | * Foaming delay | ⊚ | ⊚ | 96.8 |

As shown in Table 7, it could be confirmed that adhesion decreased as the amount of the heat foaming agent increased and the particle size increased. In addition, after the primary UV irradiation, the degree of crosslinking in the adhesive increased due to photocuring, so that expansion of the foaming agent by heat was hindered. Therefore, it could be confirmed that foaming was performed at a temperature higher than an actual foaming temperature. In particular, it could be confirmed that FN-180 did not perform foaming itself.

Since the heat foaming agent F-36D used in Example 1 and Comparative Example 1 had a low foaming temperature, an adhesive was coated on a PET film for preparing a tape, and foaming was partially performed on the surface during a drying process, resulting in a decrease in adhesion.

Consequently, it could be confirmed that the repeelable adhesive tape prepared in Example 2 had excellent adhesion to the adherend and easily peeled off without transfer of the adhesive after UV irradiation and foaming.

The repeelable adhesive including the photocurable adhesive and the heat foaming agent according to the present invention has high adhesion due to excellent wettability to

What is claimed is:

1. A repeelable adhesive comprising:
   a photocurable adhesive prepared by polymerizing a photocurable adhesive composition comprising an acrylic copolymer, a photocurable acrylate-based monomer, a photocurable urethane acrylate-based oligomer, and a crosslinking agent, in the presence of a photoinitiator; and
   a heat foaming agent,
   wherein the acrylic copolymer consists of a polymerized monomer selected from the group consisting of 2-ethylhexyl acrylate (2-EHA), vinyl acetate (VA), methyl methacrylate (MMA), acrylic acid (AA), and combinations thereof,
   the photocurable acrylate-based monomer includes a monomer selected from the group consisting of 1,4-hexanediol diacrylate, ditrimethylolpropane tetraacrylate, pentaerythritol pentaacrylate, tris(2-hydroxyalkyl) isocyanurate triepoxide, triallylisocyanurate, tris(2-hydroxyalkyl) isocyanurate triacrylate, isophorone diisocyanurate, alkyldiisocyanurate, alicyclic diisocyanurate compound, alkyl diisocyanurate trimer, decyl acrylate, lauryl acrylate, stearyl acrylate, tetrahydrofurfuryl acrylate, cyclic trimethylolformal acrylate, phenoxypolyethylene glycol acrylate, benzyl acrylate, epoxy ethyl acrylate, phenoxyethylacrylate, tripropylene glycol diacrylate, and combinations thereof, the crosslinking agent includes a crosslinking agent selected from the group consisting of 2,4-toluene diisocyanate, 2.6-toluene diisocyanate, 1.5-naphthalene diisocyanate, diphenylmethane diisocyanate, hexamethylene diisocyanate, P-xylylenediisocyanate, M-xylylenediisocyanate, dicyclohexylmethane diisocyanate, and combinations thereof, and, wherein, based on 100 parts by weight of the acrylic copolymer, an amount of the photocurable acrylate-based monomer is 1 part by weight to 50 parts by weight, an amount of the photocurable urethane acrylate-based oligomer is 5 parts by weight to 100 parts by weight, an amount of the crosslinking agent is 0.1 parts by weight to 10 parts by weight, and an amount of the photoinitiator is 0.1 parts by weight to 10 parts by weight, wherein the repeelable adhesive after curing by irradiation has a gel fraction of 80% to 86.5% calculated using Equation 2 based on ASTM D2765, $$\text{Gel fraction (\%)} = (W3-W1)/(W2-W1) \times 100 \qquad \text{Equation 2}$$

wherein W1 represents the weight of a bag, W2 represents the weight of the bag containing a specimen before extraction, and W3 represents the weight of the bag after extraction.

2. The repeelable adhesive of claim 1, wherein the photocurable urethane acrylate-based oligomer includes an aliphatic urethane acrylate having 3 to 6 functional groups.

3. The repeelable adhesive of claim 1, wherein the photocurable acrylate-based monomer includes a monomer selected from the group consisting of 1,4-hexanediol diacrylate, pentaerythritol pentaacrylate, tris(2-hydroxyalkyl) isocyanurate triepoxide, triallylisocyanurate, alkyldiisocyanurate, alicyclic diisocyanurate compound, alkyl diisocyanurate trimer, tetrahydrofurfuryl acrylate, cyclic trimethylolformal acrylate, phenoxypolyethylene glycol acrylate, epoxy ethyl acrylate, tripropylene glycol diacrylate, and combinations thereof.

* * * * *